United States Patent
Brochard et al.

(10) Patent No.: US 9,238,510 B2
(45) Date of Patent: Jan. 19, 2016

(54) BOOMERANG LINK WITH VIBRATION FILTERING ABILITY AND AIRCRAFT ENGINE MOUNT PROVIDED WITH SUCH LINK

(71) Applicant: Airbus Operations (SAS), Toulouse (FR)

(72) Inventors: Wolfgang Brochard, Toulouse (FR); Romain Terral, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 203 days.

(21) Appl. No.: 14/140,512

(22) Filed: Dec. 25, 2013

(65) Prior Publication Data

US 2014/0183297 A1    Jul. 3, 2014

(30) Foreign Application Priority Data

Dec. 28, 2012 (FR) ..................... 12 62951

(51) Int. Cl.
*B64C 27/26* (2006.01)
*B64D 27/26* (2006.01)
B64D 27/00 (2006.01)

(52) U.S. Cl.
CPC ............. *B64D 27/26* (2013.01); *B64D 27/00* (2013.01); *B64D 2027/266* (2013.01)

(58) Field of Classification Search
CPC ... B64D 27/00; B64D 27/26; B64D 2027/266
USPC ..................... 244/53 R, 54, 55, 56
See application file for complete search history.

(56) References Cited

U.S. PATENT DOCUMENTS

| | | | | |
|---|---|---|---|---|
| 7,165,743 | B2 * | 1/2007 | Pasquer | B64D 27/26 244/54 |
| 7,909,302 | B2 * | 3/2011 | Audart-Noel | B64D 27/26 244/54 |
| 8,104,708 | B2 * | 1/2012 | Chouard et al. | B64D 27/26 244/54 |
| 8,167,237 | B2 * | 5/2012 | Suciu | B64D 27/26 244/54 |
| 2013/0074517 | A1 * | 3/2013 | Suciu | B64D 27/26 60/797 |
| 2014/0183297 | A1 * | 7/2014 | Brochard | B64D 27/26 244/54 |

FOREIGN PATENT DOCUMENTS

| | | |
|---|---|---|
| DE | 102004000029 | 3/2006 |
| EP | 1129942 | 9/2001 |
| EP | 2103516 | 9/2009 |
| EP | 2500268 | 9/2012 |

OTHER PUBLICATIONS

French Search Report, Sep. 6, 2013.

* cited by examiner

*Primary Examiner* — Justin Benedik
(74) *Attorney, Agent, or Firm* — Greer, Burns & Crain Ltd.

(57) ABSTRACT

A boomerang link for aircraft engine mounts, including a first orifice and a second orifice both designed to connect the boomerang link to an aircraft pylon, and a third orifice designed to connect the boomerang link to an aircraft engine. The third orifice is offset relative to a plane passing simultaneously through an axis of the first orifice and through an axis of the second orifice. When the boomerang link is seen in section in any plane orthogonal to the axes, a straight line segment extending from the axis of the second orifice to an axis of the third orifice crosses a region external to the boomerang link. This conformation confers on the boomerang link a flexibility enabling it to filter transverse vibrations between an engine and an aircraft pylon.

14 Claims, 7 Drawing Sheets

BOOMERANG LINK WITH VIBRATION FILTERING ABILITY AND AIRCRAFT ENGINE MOUNT PROVIDED WITH SUCH LINK

CROSS-REFERENCES TO RELATED APPLICATIONS

This application claims the benefit of the French patent application No. 1262951 filed on Dec. 28, 2012, the entire disclosures of which are incorporated herein by way of reference.

BACKGROUND OF THE INVENTION

The present invention concerns a boomerang link for aircraft engine mounts.

It also concerns an engine mount including such a link, a propulsion system including such an engine mount, and an aircraft equipped with such a propulsion system, Aircraft jet engines are usually attached to the wings or to the fuselage by means of a pylon to which the jet engine is connected by means of engine mounts and links for transmitting thrust forces.

Figure 1:
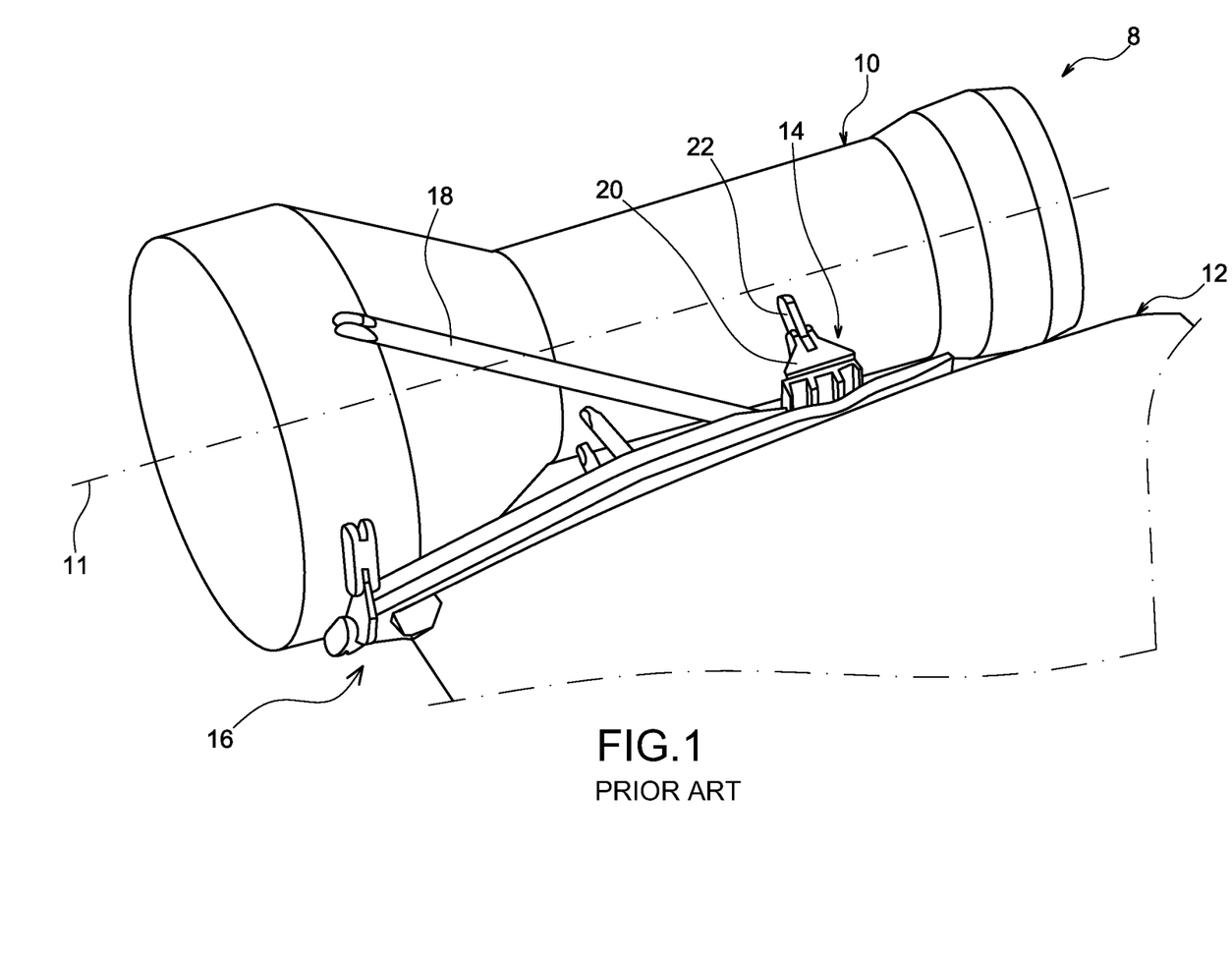
FIG. 1, already described, is a diagrammatic partial perspective view of an aircraft propulsion system of a known type comprising a jet engine, a pylon and engine mounts connecting the jet engine to the pylon.

FIG. 1 shows an example of a propulsion system 8 of the type designed to be attached laterally to an aircraft fuselage rear part. This propulsion system 8 includes a jet engine 10, for example of the open rotor pusher type, and a pylon 12, partially visible, to which the jet engine is connected. The rotors, the nacelle and the air intake of the jet engine 10 are not represented in FIG. 1, and so only the main structural casings of the jet engine can be seen. The jet engine 10 has a longitudinal axis 11.

The jet engine 10 is primarily attached to the pylon 12 by a forward engine mount 14, an aft engine mount 16, and two links 18 for transmitting thrust forces, of which only one can be seen in FIG. 1.

Figure 2:
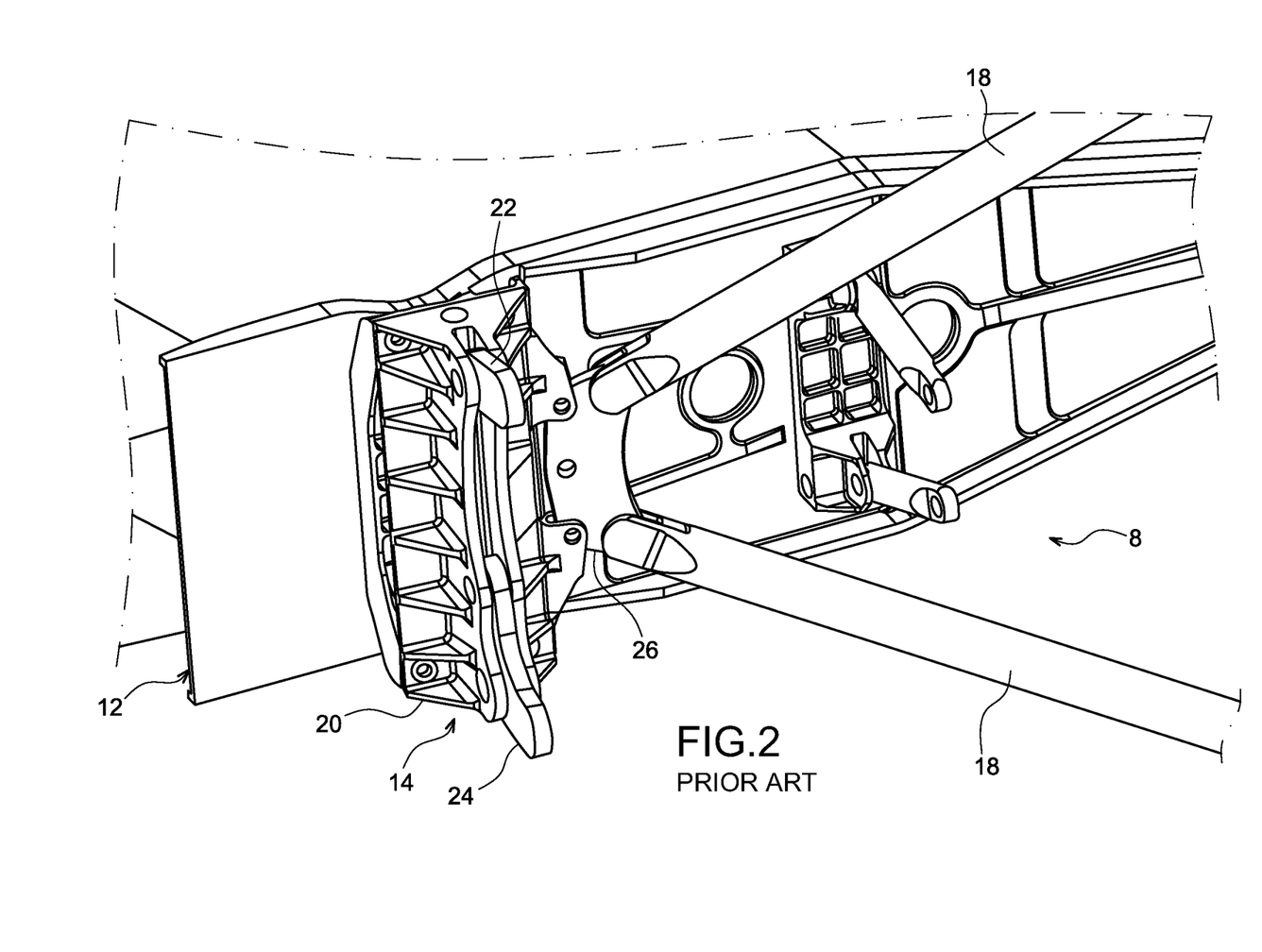
FIG. 2, already described, is a diagrammatic partial perspective view of the pylon and the engine mounts of the propulsion system from FIG. 1 minus its jet engine.

FIG. 2 shows to a larger scale the forward engine mount 14 and the connection of the links 18 to a rigid structure of the pylon 12.

The forward engine mount 14 includes a fitting 20 fixed to the pylon 12 and forming a support structure to which are connected a link 22 and a boomerang link 24. The link 22 is articulated to the fitting 20 by means of a first pivot and is designed to he articulated to the jet engine 10 by means of a second pivot. The boomerang link 24 is connected to the fitting 20 by means of two pivots and is designed to be articulated to the jet engine 10 by means of a third pivot. The pivots of the link 22 and of the boomerang link 24 are parallel to the longitudinal axis 11 of the jet engine that can be seen in FIG. 1. Finally, each of the links 18 for transmitting thrust forces is articulated to a swing-arm 26 that is itself connected to the fitting 20 by means of two pivots. The pivots of the components described above are not shown in FIG. 2 for reasons of clarity.

It should he noted that the aforementioned pivots may each incorporate a ball joint in order to impart more freedom of movement to the articulated components and to reduce unwanted moments, in a manner that is well known in itself.

A particular function of the boomerang link 24 is to take forces oriented transversely relative to the longitudinal axis of the jet engine as well as to take the engine torque about the aforementioned longitudinal axis.

However, the connection of the jet engine 10 to the pylon 12 by means of the components described above leads to transmission of vibrations from the jet engine to the pylon 12.

This is particularly problematic in the case of propulsion systems attached to the fuselage of the aircraft, as described above, because the vibrations are then transmitted directly to the structure of the fuselage. These vibrations are therefore liable to increase the wear of the structure of the fuselage and to reduce the comfort of passengers.

Propulsion systems mounted above or below the wings of the aircraft generally include a configuration of engine mounts and links for transmitting thrust forces analogous to that described above.

In these latter propulsion systems, vibrations induced by the jet engines are in theory damped by the flexibility of the wings.

However, if the intensity of these vibrations is particularly high, notably in the event of a malfunction of a jet engine, there is also a risk of the vibrations of the latter being transmitted to the structure of the fuselage of the aircraft.

SUMMARY OF THE INVENTION

A notable object of the invention is to provide a simple, economical and effective solution to this problem.

To this end the invention proposes a boomerang link for aircraft engine mounts, including:

a first orifice and a second orifice, both intended to connect said boomerang link to an aircraft pylon, and a third orifice, intended to connect said boomerang link to an aircraft engine, and wherein said third orifice is offset relative to a plane passing simultaneously through an axis of said first orifice and through an axis of said second orifice.

Of course, in a manner that is known in itself, when said boomerang link is seen in section in any plane orthogonal to the axes of said first and second orifices, a first straight line segment extending from the axis of said first orifice to an axis of said third orifice crosses a region external to said boomerang link.

According to the invention, said boomerang link is conformed so that, when it is seen in section in any plane orthogonal to said axes, a second straight line segment extending from the axis of said second orifice to the axis of said third orifice crosses said region external to the boomerang link.

It is to be understood that, using the terminology of the present invention, the first, second and third orifices are arranged in this order along the boomerang link.

Thus the invention proposes a boomerang link of novel shape, making it possible to impart to this boomerang link properties of elasticity vis-à-vis transverse forces, i.e., forces oriented orthogonally to the aforementioned axes.

Such flexibility or elasticity enables the boomerang link to filter any relative vibrations of connecting members mounted in respective aforementioned orifices of the boomerang link as well as supporting loads liable to be applied to this boomerang link.

The degree of flexibility or of elasticity of the boomerang link may be increased notably by means of one of the following optional features or by means of a combination of a plurality of these features.

Said region external to the boomerang link is preferably crossed by a portion of said second straight line segment having a length greater than or equal to one third of the length of said second straight line segment and more preferably greater than half the length of this second straight line segment.

When said boomerang link is seen in section in any plane orthogonal to the respective axes of said orifices, a first portion of the boomerang link, connecting said second orifice to said third orifice, advantageously has an edge, situated on the same side as said second straight line segment, at least a portion of which is offset from a straight line superposed on said second straight line segment by a distance greater than one quarter of the length of said second straight line segment and more preferably greater than one third of the length of said second straight line segment.

When said boomerang link is seen in section in any plane orthogonal to the respective axes of said orifices, a second portion of the boomerang link, situated between said second and third orifices and delimited by two half-lines each extending from the middle of the second straight line segment in the direction of the boomerang link, preferably has two opposite curved edges each having a concavity oriented toward said second straight line segment, at any point from one to the other of said half-lines.

Said half-lines preferably form between them a salient angle greater than 90 degrees.

The curved edge situated on the same side as said second straight line segment preferably has, at any point on said second portion of the boomerang link, a radius of curvature greater than one quarter of the length of the second straight line segment, and said opposite curved edge preferably has, at any point on said second portion of the boomerang link, a radius of curvature greater than one third of the length of the second straight line segment.

When said boomerang link is seen in section in any plane orthogonal to the respective axes of said orifices, said second portion of the boomerang link advantageously has a section decreasing in the direction from said second orifice toward said third orifice, from one to the other of said two half-lines.

When said boomerang link is seen in section in any plane orthogonal to the respective axes of said orifices, the boomerang link is preferably conformed so that there exist two half-lines having a common origin such that a first half-line passes through the respective axes of said first and second orifices, a second half-line is tangential to a mid-line of said second portion of the boomerang link at a point situated on the same side as said third orifice relative to said first half-line, and these half-lines form between them an angle less than 90 degrees, more preferably less than 75 degrees and ideally between 50 degrees and 70 degrees.

The invention also concerns an aircraft engine mount including:
  a support structure designed to be fastened to an aircraft pylon and including a first orifice and a second orifice,
  a first connecting member and a second connecting member that are respectively mounted with a close fit in said first and second orifices of said support structure, and
  a third connecting member designed to be connected to an aircraft engine.

According to the invention, the engine mount includes at least one boomerang link of the type described above, said first and second connecting members are mounted with a close fit in said first and second orifices of said boomerang link, and said third connecting member is mounted with a close fit in said third orifice of said boomerang link.

The aforementioned boomerang link makes it possible to enable the engine mount to filter any vibrations of the third connecting member relative to the second connecting member. Such vibrations can in fact be transmitted to the third connecting member by an aircraft engine connected to the latter connecting member.

Generally speaking, each of said connecting members takes the form of a pivot, for example, or includes such a pivot. This pivot advantageously incorporates a ball joint, in a manner known in itself.

The engine mount advantageously includes a mechanical energy dissipating device connecting said second and third connecting members so as to dissipate at least some of the energy of any relative vibrations of these connecting members.

Such a device, also referred to as a damper hereinafter, preferably has a working axis passing through the respective axes of said second and third orifices of said boomerang link.

Moreover, the engine mount may include, in addition to said boomerang link, called a "flexible boomerang link", at least one other boomerang link, called a "rigid boomerang link", the latter including:
  a first orifice and a second orifice in which said first and second connecting members, respectively, are mounted with a close fit, and
  a third orifice in which said third connecting member is mounted with clearance,
  said rigid boomerang link being conformed so that, when it is seen in section in any plane orthogonal to respective axes of said orifices of said rigid boomerang link, a first straight line segment extending from the axis of the first orifice to an axis of the third orifice of the rigid boomerang link crosses a region external to the rigid boomerang link, but a second straight line segment extending from the axis of said second orifice to the axis of said third orifice of the rigid boomerang link is entirely situated inside said rigid boomerang link.

The rigid boomerang link makes it possible to absorb transverse forces having an intensity above a predetermined threshold, as will emerge more clearly hereinafter.

Said rigid boomerang link is preferably conformed so that, when it is seen in section in any plane orthogonal to the respective axes of said orifices of said rigid boomerang link, any pair of half-lines having a common origin, such that a first of these half-lines passes through the respective axes of said first and second orifices of said rigid boomerang link and a second of these half-lines is tangential to a mid-line of a portion of the rigid boomerang link connecting said second and third orifices thereof, at a point situated on the same side of said first half-line as said third orifice forms between said half-lines an angle greater than 90 degrees.

The invention also concerns an aircraft propulsion system including a jet engine, a pylon designed to connect said jet engine to an aircraft cell and at least one engine mount of the type described above connecting said jet engine to said pylon.

When said engine mount comprises at least one flexible boomerang link and at least one rigid boomerang link as described above, said flexible and rigid boomerang links are advantageously conformed so that said flexible boomerang link maintains a clearance between said third connecting member and said rigid boomerang link when the transverse forces applied to said engine mount are at a level below a predetermined threshold and so that said third connecting member comes into abutment in said third orifice of said rigid boomerang link thanks to sufficient deformation of said flexible boomerang link when said transverse forces are at a level above said predetermined threshold.

When the transverse forces are at a level below the aforementioned threshold, these forces are therefore transmitted entirely by each flexible boomerang link and each rigid boomerang link remains inactive.

On the other hand, when the transverse forces are at a level above the aforementioned threshold, the surplus force is transmitted by each rigid boomerang link and does not induce any additional deformation of each flexible boomerang link.

The aforementioned threshold is preferably defined as being equal to a designed maximum load level for a phenomenon of blade loss or of windmilling imbalance operation following such a phenomenon.

This configuration therefore makes it possible to facilitate understanding and control of the mechanical behavior of the engine mount in the event of extreme forces, this control being necessary to satisfy regulatory requirements, as well as benefiting from the flexibility of each flexible boomerang link both in normal operation and in the event of blade loss.

The invention finally concerns an aircraft including at least one propulsion system of the type described above.

BRIEF DESCRIPTION OF THE DRAWINGS

The invention will be better understood and other details, advantages and features thereof will become apparent on reading the following description given by way of nonlimiting example and with reference to the appended drawings, in which:

FIG. 5a is a diagrammatic sectional view of the boomerang link from

FIG. 4 showing certain geometrical properties of the boomerang link;

In all of these figures, identical references may designate identical or analogous elements.

DETAILED DESCRIPTION OF THE PREFERRED EMBODIMENTS

Figures 3, 4:
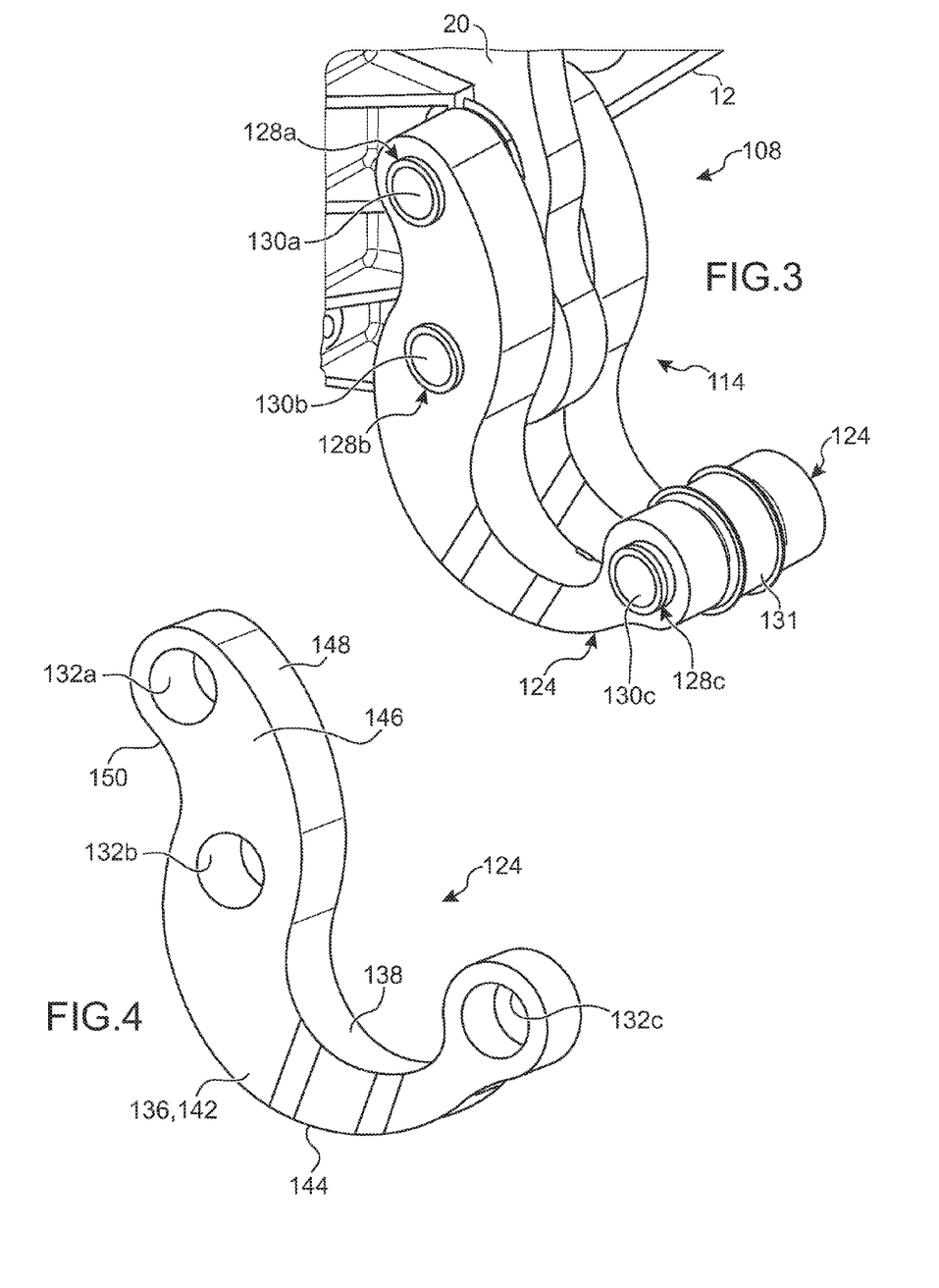
FIG. 3 is a diagrammatic partial perspective view of an engine mount in accordance with a first preferred embodiment of the invention.
FIG. 4 is a diagrammatic perspective view of a boomerang link forming part of the engine mount from FIG. 3.

FIG. 3 shows part of a propulsion system 108 of an aircraft that is similar to the propulsion system 8 from FIGS. 1 and 2 but in which the forward engine mount 114 includes two boomerang links 124 provided with flexibility enabling filtering of vibrations from the jet engine. For reasons of clarity, this jet engine is not shown in FIG. 3.

The two boomerang links 124 are similar and are mounted in parallel, i.e., they share the same axes, so as to provide an intrinsic safety function, also known as a "failsafe function", as will become clearer hereinafter.

The forward engine mount 114 therefore includes a fitting 20 fixed to a primary structure of the pylon 12 of the propulsion system and including two orifices (masked in the figures) for a first connecting member 128a and a second connecting member 128b to pass through. Each of these connecting members essentially comprises a pin or pivot 130a, 130b provided with a bearing (masked in FIG. 3) arranged inside the corresponding orifice of the fitting 20.

The forward engine mount 114 further includes the two boomerang links 124 mounted on the aforementioned connecting members 128a, 128b and carrying a third connecting member 128c essentially comprising a pin or pivot 130c provided with a bearing 131 disposed between the two boomerang links 124 and designed to be connected to the jet engine of the propulsion system (not visible in the figures).

The pivots 130a and 130b preferably incorporate a ball joint mounted in the corresponding orifice of the fitting 20, the latter being conformed to enable a ball-joint connection with the corresponding pivot, in order to reduce unwanted forces, in a manner known in itself in an analogous manner, the pivot 130c preferably incorporates a ball joint mounted in the bearing 131.

One boomerang link 124 will now be described in detail with reference to FIGS. 4, 5a and 5b.

The boomerang link 124 includes a first orifice 132a intended to receive the pivot 130a of the first connecting member 128a with a close fit and a second orifice 132b intended to receive the pivot 130b of the second connecting member 128b, also with a close fit.

The boomerang link 124 further includes a third orifice 132c intended to receive the pivot 130c of the third connecting member 128c with a close fit.

Figure 5A:
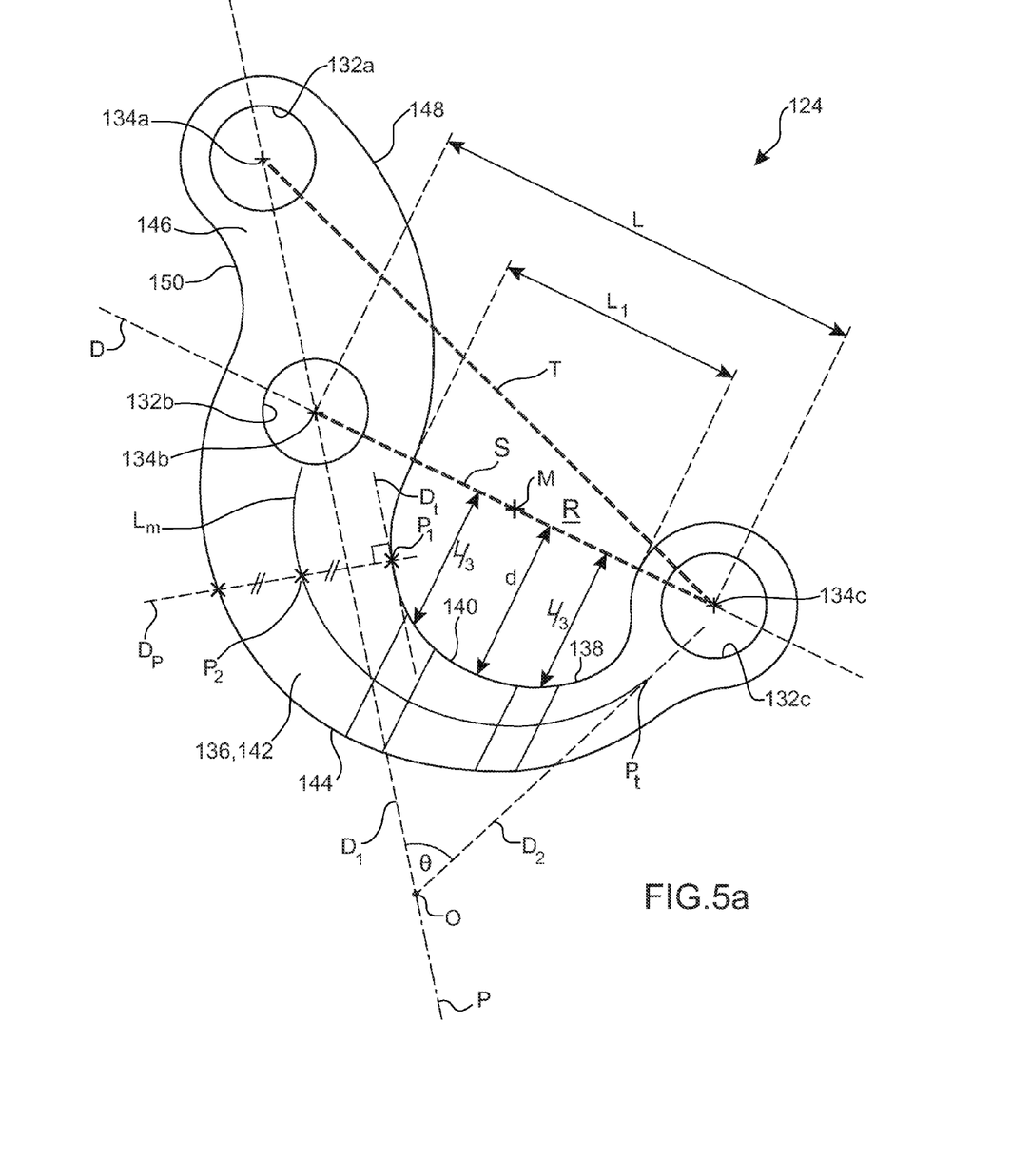
Figure 5B:
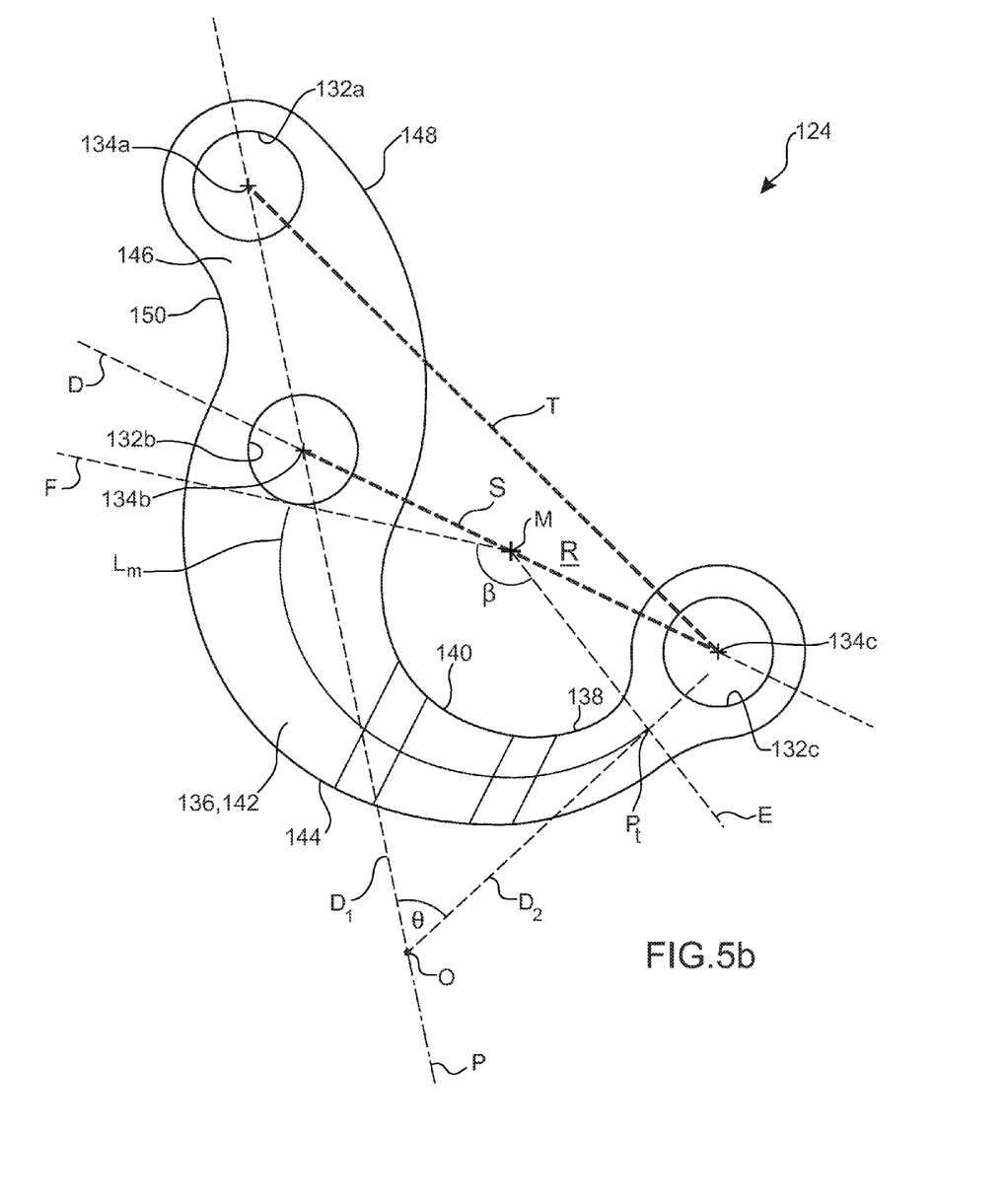
FIG. 5b is a view similar to FIG. 5a showing other geometrical properties of the boomerang link.

As FIG. 4 shows, the shape of the boomerang link 124 may be obtained by projecting its section, represented in each of FIGS. 5a and 5b, in a direction orthogonal to the plane of that section, i.e., a direction parallel to the respective axes 134a, 134b, 134c of the orifices 132a, 132b and 132c. Consequently, the following description of the boomerang link 124 refers to FIGS. 5a and 5b and is valid for any section plane orthogonal to the aforementioned axes. Nevertheless, without departing from the scope of the invention, the boomerang link 124 may be of a shape varying along the direction of the aforementioned axes.

In a manner known in itself, the third orifice 132c is offset from a plane P passing simultaneously through the axis 134a of the first orifice 132a and through the axis 134b of the second orifice 132b.

Moreover, a first straight light segment T extending from the axis 134a of the first orifice 132a to the axis 134c of the third orifice 132c crosses a region R external to the boomerang link 124.

In accordance with the invention, another straight line segment S extending from the axis 134b of the second orifice 132b to the axis 134c of the third orifice 132c also crosses the region R external to the boomerang link 124.

The length L1 of a portion of the second straight line segment S entirely situated within the region R external to the boomerang link 124 is preferably greater than one third of the length L of this second straight line segment S (FIG. 5a). In the example shown, the length L1 of said portion of the second straight line segment S is in particular greater than half the length L of the latter.

Moreover, a first portion 136 of the boomerang link 124, connecting the second orifice 132b to the third orifice 132c, has an edge 138, situated on the same side as the second straight line segment S, a portion 140 of which is offset from a straight line D superposed on the second straight line segment S by a distance d greater than one third of the length L of said second straight line segment S (FIG. 5a). In a conventional manner, the distance d is measured orthogonally to the straight line D.

Moreover, in a second portion 142 of the boomerang link 124 included in the aforementioned first portion 136 of the latter and delimited by two half-lines E and F each extending from the middle M of the second straight line segment S in the direction of the boomerang link 124 (FIG. 5b), the aforementioned edge 138 is curved and has a concavity oriented toward the second straight line segment S, in every point of edge 138 from a first end of the second portion 142 corresponding to the half-line E to a second end of the second portion 142 corresponding to the half-line F. The same applies to an opposite edge 144 of the first portion 136 of the boomerang link. Of course, the second portion 142 of the boomerang link 124 being included in the aforementioned first portion 136 thereof, the second portion 142 is between the second orifice 132b and the third orifice 132c of the boomerang link.

The two half-lines E and F delimiting the aforementioned second portion 142 of the boomerang link form an angular sector with a salient angle β equal to about 120 degrees and preferably greater than 90 degrees inside which lies the second portion 142 of the boomerang link.

At any point on the second portion 142 of the boomerang link, the aforementioned edge 138 advantageously has a radius of curvature greater than one quarter of the length L of the second straight line segment S. In the example shown, the radius of curvature of the edge 138 at any point on the second portion 142 is greater than one third of the length L of the second straight line segment S.

In an analogous manner, at any point on the second portion 142 of the boomerang link, the edge 144 opposite the edge 138 advantageously has a radius of curvature greater than one third of the length L of the second straight line segment S. In the example shown, the radius of curvature of the edge 144 at any point on the second portion 142 is greater than half the length L of the second straight line segment S.

Moreover, FIGS. 5a and 5b show two half-lines having a common origin O and such that:

the first half-line D1 passes through the respective axes 134a, 134b of the first and second orifices 132a, 132b, and the second half-line D2 is tangential to a mid-line Lm of the second portion 142 of the boomerang link at a point Pt situated on the same side of the first half-line D1 as the third orifice 132c.

In the example shown, the half-lines D1 and D2 form between them an acute angle θ equal to about 60 degrees. Generally speaking, the angle θ is preferably less than 90 degrees, and more preferably less than 75 degrees, and ideally between 50 degrees and 70 degrees.

By "mid-line" must be understood a line defined as the set of points P2 (FIG. 5a) obtained by projecting each point P1 of the aforementioned edge 138 in a direction Dp perpendicular to the direction. Dt tangential to the edge 138 at the level of said point P1 in the direction of the opposite edge 144 and stopping half-way to that opposite edge 144.

It is further apparent in FIGS. 4 and 5b that a second portion 142 of the boomerang link has a section decreasing in the direction from the second orifice 132b toward the third orifice 132c from the half-line F to the other half-line E.

It should be noted that a third portion 146 of the boomerang link 124, connecting the first orifice 132a to the second orifice 132b, has opposite curved edges 148 and 150 the concavity of which is reversed relative to the concavity of the edges 138, 144 in the second portion 142 of the boomerang link.

In operation, by virtue of the geometry of the boomerang links 124, the engine mount 114 has an elasticity vis-à-vis transverse forces, i.e., forces oriented orthogonally to the axes 134a, 134b, 134c.

The boomerang links 124 therefore enable filtering of any vibrations between the jet engine connected to the third connecting member 128c and the pylon connected to the first and second connecting members 128a, 128b (FIG. 3), notably in the event of blade loss and during windmilling imbalance operation following such blade loss.

Figure 6:
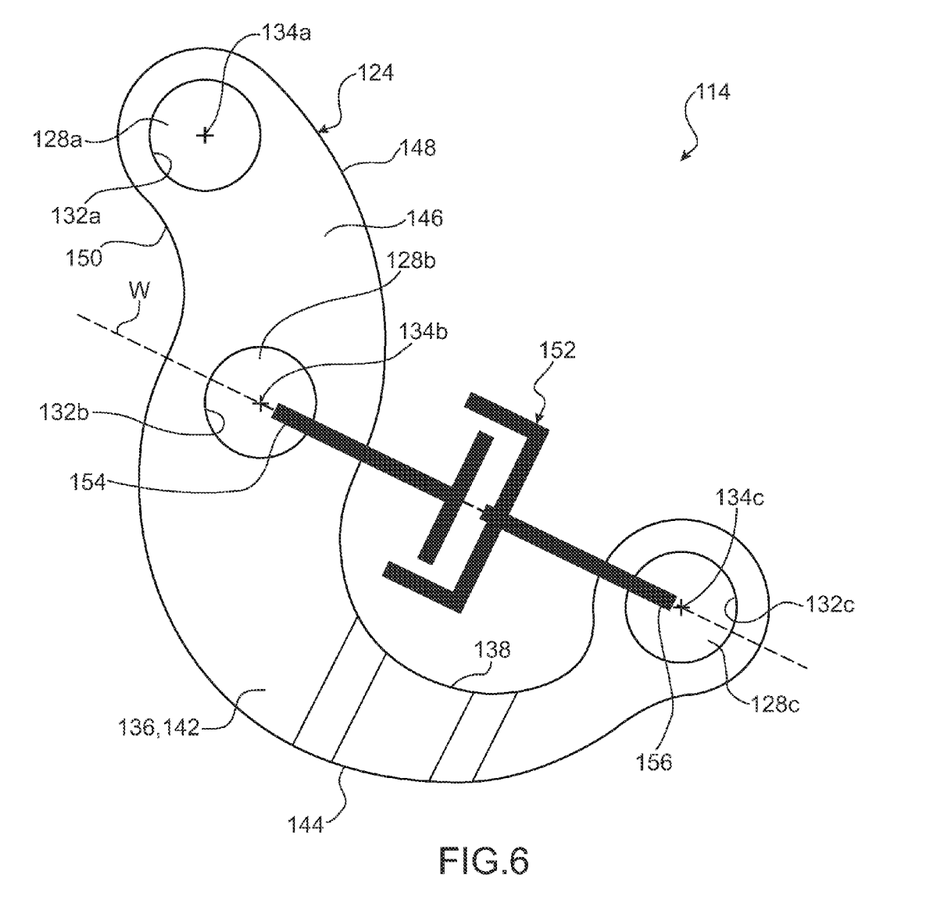
FIG. 6 is a diagrammatic partial sectional view of an engine mount in accordance with a second preferred embodiment of the invention in a plane orthogonal to the connecting members of the engine mount and passing through a boomerang link thereof.

FIG. 6 shows a second embodiment of the invention in which the engine mount 114 further includes a mechanical energy dissipating device or damper 152 connecting together the second and third connecting members 128b, 128c.

The damper 152, represented very schematically, has a first longitudinal end 154 pivotably mounted on the second connecting member 128b and a second longitudinal end 156 pivotably mounted on the third connecting member 128c. The damper 152 therefore has a working axis W passing through the respective axes 134b, 134c of the second and third orifices 132b, 132c of each boomerang link 124.

This damper 152 may be of any appropriate conventional type, for example of the hydraulic, hydropneumatic, magneto-rheologic or other type.

Generally speaking, the damper 152 enables dissipation of at least sonic of the kinetic energy related to any vibrations between the second and third connecting members 128b, 128c.

Alternatively, the damper 152 may be fixed directly to one of the boomerang links 124 or to each of these boomerang links, preferably in such a manner that the working axis of the damper passes through the respective axes 134b, 134c of the second and third orifices 132b, 132c of each boomerang link 124.

In the first and second embodiments described above, the boomerang links 124 are sized to withstand the extreme loads specified by the regulatory requirements.

Figure 7:
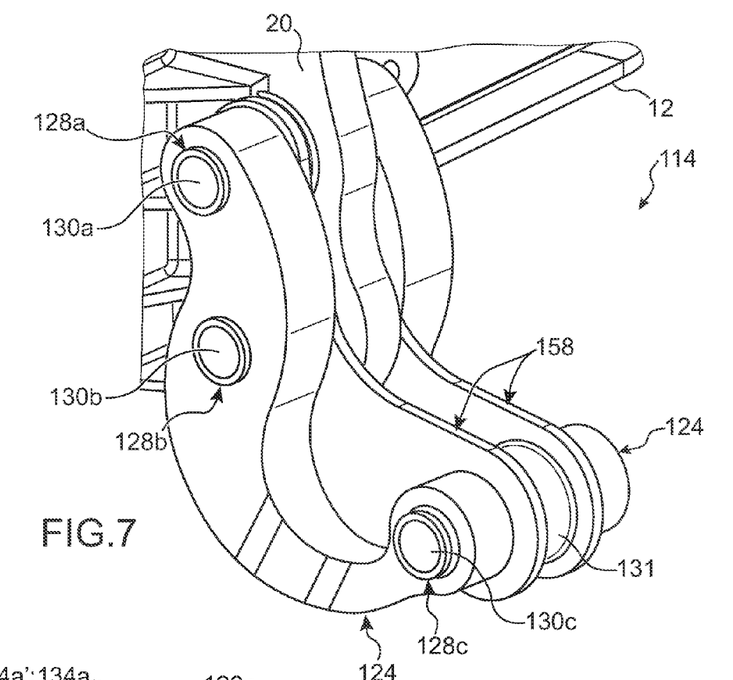
FIG. 7 is a diagrammatic partial perspective view of an engine mount in accordance with a third preferred embodiment of the invention.
Figure 8:
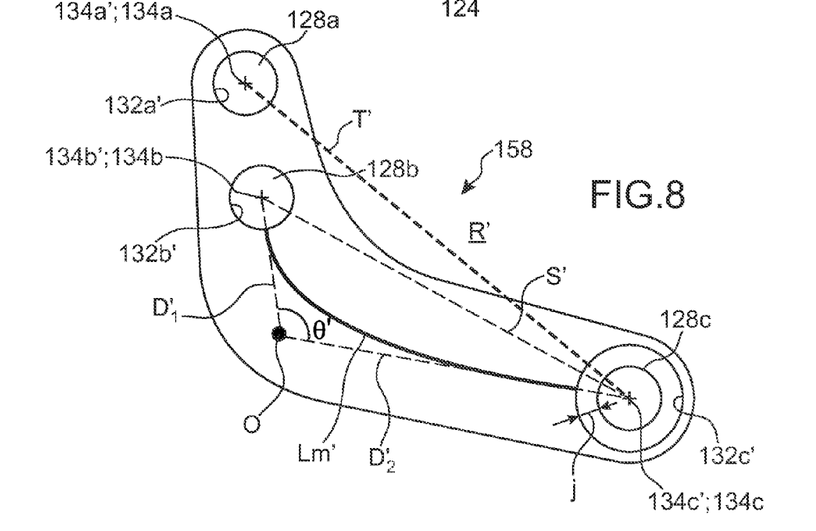
FIG. 8 is a diagrammatic sectional view of the engine mount from FIG. 7 in a plane orthogonal to the connecting members of the engine mount and passing through a rigid boomerang link forming part of that engine mount.

FIG. 7 shows a third embodiment of the invention in which each boomerang link 124, referred to as a "flexible boomerang link" is associated with another boomerang link 158, referred to as a "rigid boomerang link", also visible in FIG. 8.

Each rigid boomerang link 158 includes a first orifice 132a' and a second orifice 132b' (FIG. 8) in which the first and second connecting members 128a, 128b, respectively, are mounted with a close fit.

Each rigid boomerang link 158 also includes a third orifice 132c' in which the third connecting member 128c is mounted with a clearance j.

FIG. 8 notably shows the rigid boomerang link 158 in section on a plane orthogonal to the respective axes 134a', 134b', 134c' of the orifices of this rigid boomerang link, which are respectively superposed on the axes 134a, 134b, 134c, respectively, of the orifices of the corresponding flexible boomerang link 124.

As this FIG. 8 shows, a first straight line segment T' extending from the axis 134a' of the first orifice 132a' to the axis 134c' of the third orifice 132c' crosses a region R' external to the rigid boomerang link 158, but a second straight line segment S' extending from the axis 134b' of the second orifice 132b' to the axis 134c' of the third orifice 132c' is entirely situated inside the rigid boomerang link 158.

Moreover, it is clearly apparent that any pair of half-lines D1', D2' having a common origin O and of which one D1' passes through the respective axes 134a', 134b' of the first and second orifices and the other D2' is tangential to a mid-line Lm' of the rigid boomerang link 158 at any point between the first half-line D and the third orifice 132c' forms between the two half-lines D1' and D2' an angle θ' greater than 90 degrees.

The rigid boomerang links 158 therefore have a conventional shape and in particular have no elasticity with respect to the load levels to which the engine mount 114 is liable to be subjected.

In the engine mount 114 in accordance with this third embodiment of the invention, the flexible boomerang links 124 and the rigid boomerang links 158 are such that the flexible boomerang links 124 maintain a clearance (indicated by the arrow j in FIG. 8) between the pivot 130c of the third connecting member 128c and the rigid boomerang links 158 as long as the loads applied to the engine mount do not exceed a predetermined threshold corresponding to a designed maximum load level for a blade loss phenomenon or windmill* imbalance operation following such a phenomenon. The deformation of the flexible boomerang links 124 is therefore limited as long as the applied loads do not reach the aforementioned threshold.

On the other hand, if the load reaches the aforementioned threshold, each flexible boomerang link 124 is deformed to the point at which the pivot 130c of the third connecting member 128c comes into abutment in the third orifice 132c' of each rigid boomerang link 158. The surplus force is therefore transmitted directly by the rigid boomerang links 158 without inducing any additional deformation of the flexible boomerang links 124.

In the example shown, the third orifice 132c' of each rigid boomerang link 158 is of circular shape and so the clearance j is the same for all directions around the axis 134c.

Alternatively, the third orifice 132c' of each rigid boomerang link 158 may be of non-axisymmetrical shape so that the clearance j varies according to the direction around the axis 134c. The shape of the third orifice 132c' can therefore be modulated as a function of the direction and the level of the loads to which the engine mount 114 is liable to be subjected.

Of course, and without departing from the scope of the invention, the engine mount in accordance with the invention may be applied to supporting jet engines of different types, and may furthermore be adapted to a propulsion system fixed on or under the wings of an aircraft.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A boomerang link for aircraft engine mounts, including:
   a first orifice and a second orifice, both intended to connect said boomerang link to an aircraft pylon, and
   a third orifice, intended to connect said boomerang link to an aircraft engine, wherein:
   said third orifice is offset relative to a plane passing simultaneously through an axis of said first orifice and through an axis of said second orifice, and
   when said boomerang link is seen in section in any plane orthogonal to the axes of said first and second orifices, a first straight line segment extending from the axis of said first orifice to an axis of said third orifice crosses a region external to said boomerang link,
   wherein said boomerang link is conformed so that, when said boomerang link is seen in section in any plane orthogonal to said axes of said first and second orifices, a second straight line segment extending from the axis of said second orifice to the axis of said third orifice crosses said region external to the boomerang link.

2. The boomerang link according to claim 1, wherein said region external to the boomerang link is crossed by a portion of said second straight line segment having a length greater than or equal to one third of the length of said second straight line segment.

3. The boomerang link according to claim 1, wherein, if said boomerang link is seen in section in any plane orthogonal to the respective axes of said orifices, a first portion of the boomerang link, connecting said second orifice to said third orifice, has an edge, situated on the same side as said second straight line segment, at least a portion of which is offset from a straight line superposed on said second straight line segment by a distance greater than one quarter of the length of said second straight line segment.

4. The boomerang link according to claim 1, wherein, if said boomerang link is seen in section in any plane orthogonal to the respective axes of said orifices, a second portion of the boomerang link, situated between said second and third orifices and delimited by two half-lines and each extending from the middle of the second straight line segment in the direction of the boomerang link, has two opposite curved edges each having a concavity oriented toward said second straight line segment, at any point from one to the other of said half-lines.

5. The boomerang link according to claim 4, wherein said half-lines form between them a salient angle greater than 90 degrees.

6. The boomerang link according to claim 4, wherein:
   the curved edge situated on the same side as said second straight line segment has, at any point on said second portion of the boomerang link, a radius of curvature greater than one quarter of the length of the second straight line segment, and
   the curved edge that is situated on the other side of the boomerang link has, at any point on said second portion of the boomerang link, a radius of curvature greater than one third of the length of the second straight line segment.

7. The boomerang link according to claim 4, wherein, if said boomerang link is seen in section in any plane orthogonal to the respective axes of said orifices, said second portion of the boomerang link has a section decreasing in the direction from said second orifice toward said third orifice, from one to the other of said two half-lines.

8. The boomerang link according to claim 4, wherein, if said boomerang link is seen in section in any plane orthogonal to the respective axes of said orifices, there exist two half-lines having a common origin such that:
   a first half-line passes through the respective axes of said first and second orifices,
   a second half-line is tangential to a mid-line of said second portion of the boomerang link at a point situated on the same side as said third orifice relative to said first half-line, and
   these half-lines form between them an angle less than 90 degrees.

9. An aircraft engine mount including:
   a support structure designed to be fastened to an aircraft pylon and including a first orifice and a second orifice,
   a first connecting member and a second connecting member that are respectively mounted with a close fit in said first and second orifices of said support structure,
   a third connecting member designed to be connected to an aircraft engine, and
   at least one boomerang link according to claim 1, wherein said first and second connecting members are mounted with a close fit in said first and second orifices of said boomerang link, and wherein said third connecting member is mounted with a close fit in said third orifice of said boomerang link.

10. The aircraft engine mount according to claim 9, further including a mechanical energy dissipating device connecting said second and third connecting members so as to damp any relative vibrations of these connecting members.

11. The aircraft engine mount according to claim 9, including, in addition to said boomerang link, called a "flexible boomerang link", at least one other boomerang link, called a "rigid boomerang link", the rigid boomerang link including:

a first orifice and a second orifice in which said first and second connecting members, respectively, are mounted with a close fit, and a third orifice in which said third connecting member is mounted with clearance, said rigid boomerang link being conformed so that, if said rigid boomerang link is seen in section in any plane orthogonal to respective axes of said orifices of said rigid boomerang link, a first straight line segment extending from the axis of the first orifice to an axis of the third orifice of the rigid boomerang link crosses a region external to the rigid boomerang link, but a second straight line segment extending from the axis of said second orifice to the axis of said third orifice of the rigid boomerang link is entirely situated inside said rigid boomerang link.

12. An aircraft propulsion system including a jet engine and a pylon designed to connect said jet engine to an aircraft cell, as well as at least one engine mount according to claim 9 connecting said jet engine to said pylon.

13. An aircraft propulsion system including a jet engine and a pylon designed to connect said jet engine to an aircraft cell, as well as at least one engine mount according to claim 11 connecting said jet engine to said pylon, said flexible boomerang link and said rigid boomerang link of this engine mount being conformed so that said flexible boomerang link maintains a clearance between said third connecting member and said rigid boomerang link if transverse forces apply to said engine mount at a level below a predetermined threshold and so that said third connecting member comes to abut in said third orifice of said rigid boomerang link thanks to sufficient deformation of said flexible boomerang link if said transverse forces are at a level above said predetermined threshold.

14. An aircraft comprising at least one propulsion system according to claim 12.

* * * * *